Figure 1:
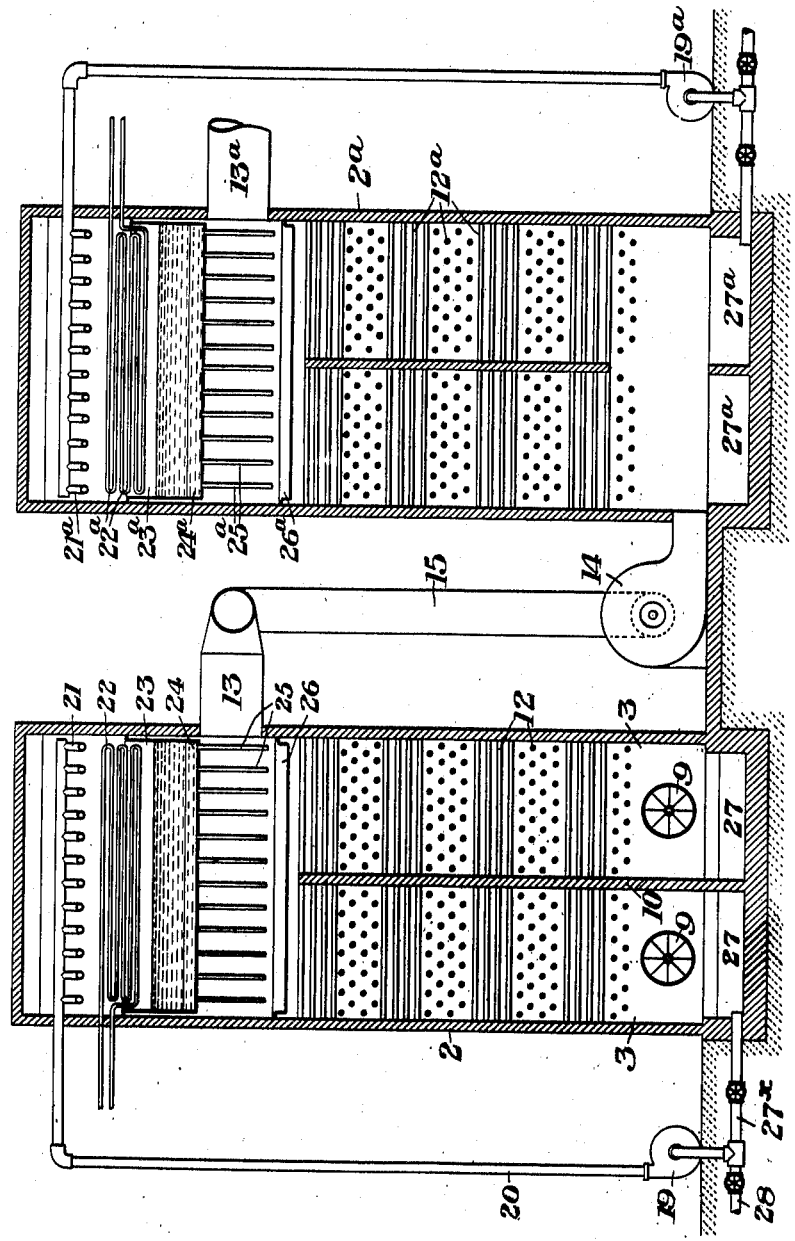

J. GAYLEY.
METHOD OF DRYING AIR.
APPLICATION FILED MAY 13, 1909.

1,002,578.

Patented Sept. 5, 1911.
2 SHEETS—SHEET 1.

WITNESSES
R A Balderson
D. B. Bluming

INVENTOR
James Gayley
by Bakewell Byrnes & Barnele
his attys

J. GAYLEY.
METHOD OF DRYING AIR.
APPLICATION FILED MAY 13, 1909.
1,002,578.
Patented Sept. 5, 1911.
2 SHEETS—SHEET 2.
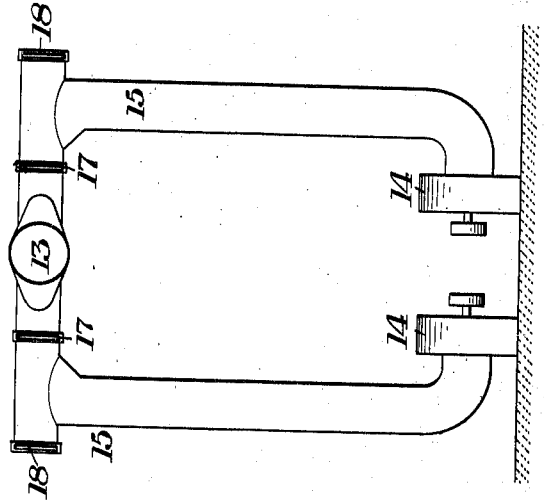
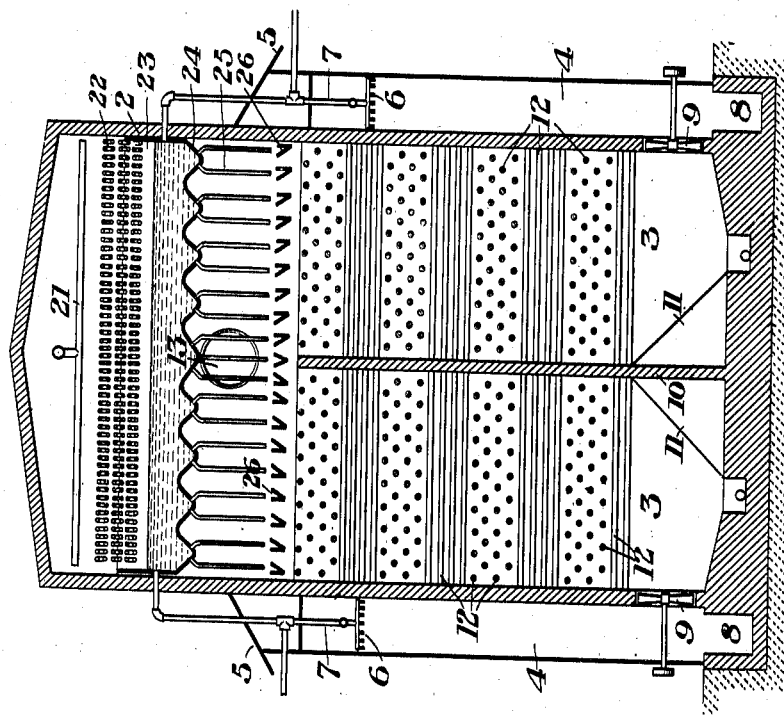
WITNESSES
R A Balderson
D. B. Bleming
INVENTOR
James Gayley
by Bakewell, Byrnes & Parmelee
his attys

UNITED STATES PATENT OFFICE.

JAMES GAYLEY, OF NEW YORK, N. Y.

METHOD OF DRYING AIR.

1,002,578.  Specification of Letters Patent.  Patented Sept. 5, 1911.

Application filed May 13, 1909. Serial No. 495,657.

*To all whom it may concern:*

Be it known that I, JAMES GAYLEY, of New York, in the county of New York and State of New York, have invented a new and useful Improvement in Methods of Drying Air, of which the following is a full, clear, and exact description, reference being had to the accompanying drawings, forming part of this specification, in which—

Figure 1 is a sectional side elevation of apparatus constructed in accordance with my invention; Fig. 2 is a vertical section at right angles to Fig. 1; and Fig. 3 is a detail view of the pipe connections between the towers.

My invention relates to the drying of air, particularly for use in connection with the air blast supplied to blast furnaces, converters, etc., in metallurgical work.

The object of the invention is to provide an improved method of refrigeration which will act economically and efficiently without the use of pipes or channels through which artificially cooled fluid is circulated.

In carrying out my invention, I provide a cooling system in stages, preferably two stages in both of which stages the air is subjected to the direct action of a cooling liquid. The air is preferably forced into the lower portion of the cooling tower in the first stage, passes upwardly through the tower in the opposite direction to a spray or rain of liquid, preferably artificially cooled water, and then passes out at the top and is fed preferably by an intermediate blower into a second somewhat similar apparatus, in which the moisture is still further reduced, and from which the dried air passes to the blowing engine, and thence to the point of use. I preferably employ a non-congealable liquid, such as cold brine, in the second chamber, in order to produce a lower temperature of the air than in the first chamber or stage. The water in the first chamber is preferably cooled to a temperature of about 35° F., this acting to cool the air to about 40° C., the larger part of the moisture being removed so that the air will enter the second stage with a substantially uniform content of moisture; and in the second stage it is reduced to or below zero degrees C. by the sprays of cold brine or other non-congealable refrigerating liquid. I also preferably arrange the chambers so that during the periods when the moisture of the air is relatively low, the first chamber may be cut out and the air fed directly to the second chamber.

The cooling of the water for the cooling tower is preferably carried out by means of an ammonia condenser which will require comparatively small energy, owing to the small degree of cooling, this resulting in a high back pressure under which the compressor will work economically. The refrigerating capacity of an ammonia compressor depends upon the number of pounds of gas it will handle in a given unit of time. The weight of ammonia gas handled depends upon the efficiency of the compressor and upon the suction pressure at which the gas is delivered into the compressor. Since the weight of ammonia gas varies approximately with the absolute pressure, it follows that the refrigerating capacity of an ammonia compressor working under a suction pressure of thirty pounds will be about fifty per cent. greater than one working under fifteen pounds gage pressure. This ammonia compressor cooling the water down to thirty-three degrees F., will work at about forty-five pounds back pressure when cooling water from 80° to 33° F., so it will work under very economical conditions. The air will leave the cooling tower at about 40° F., and with three grains per cubic foot or less moisture.

In the drawings, 2 represents the first cooling tower which I have shown as divided into four chambers 3, each provided with an external air duct 4, of sheet metal or other suitable material. The upper end of this duct 4 is open and preferably protected by a spaced apart roof 5. These ducts are of considerable length and I preferably arrange spray devices 6 in their upper portion to which water is supplied through pipes 7. This spray will filter away the coarser impurities of the air and also cool it somewhat. The lower ends of the ducts terminate in catch basins 8, where the dirty water is collected and led to the sewer.

The lower portions of the ducts open into the lower ends of the chambers 3, and the ports are preferably provided with fans 9, which will force the air from the ducts into the cooling chambers against the resistance of the sprays in the chambers, of which I have shown four, formed by the partitions 10.

I preferably arrange inclined baffle plates 11 at the lower ends of the cooling chambers opposite to the fans to deflect the air upwardly and as the air rises, it is preferably split up by grids or grate-work which I have shown as consisting of round wooden poles 12, which are impregnated to resist the rotting action of the water, though any suitable arrangement of baffle plates may be used. The function of these baffles is to give the largest possible contact between the up-going air and the downwardly trickling water or brine, as shown. At the top of the tower, the air is led through pipe 13, to fans 14, through branch pipes 15, and thence to the second cooling tower $2^a$. The branch pipes 15 are, as shown in Fig. 3, provided with valves 17, whereby the cooling tower may be shut off from the refrigerating building fans, and through valves 18, opened to allow the outside air to pass directly to these fans 14.

The water for the cooling tower is shown as being lifted by a pump 19, through pipe 20, to the top of the tower, and through a series of pipes 21, which are split longitudinally, from which it overflows evenly over the coils 22, carrying the ammonia at a low temperature which cools the water to just above the freezing point. The overflowing water collects in a tank 23, which forms the cross partition between the air chambers and the ammonia loft and in which a constant water level is maintained slightly below the coils. The bottom of the tank is corrugated, as shown at 24, and from these corrugations the water is fed through a large number of pipes 25, to open troughs 26. The use of the corrugated bottom of the tank and the long pipes leading from it to the troughs is especially efficient in cooling the air. An air space must be left between the tank and the grating to allow the unimpeded passage of the air to the outlet pipe 13, as a mist or water spray in this space would hinder the air passage. The use of the pipes from the tank to the trough do not clog up or interfere with the air passage, but as they contain very cold water and are arranged in zig-zag or staggered form, the air comes into intimate contact with them and is effectually cooled.

As before stated, the grate-work or baffle plates and air chambers split up the descending water into a fine mist and break up the ascending air into small currents which mix thoroughly therewith, thus effecting a maximum cooling of the air with a minimum amount of water. The water overflows uniformly from the open troughs and is split up by the grate-work and evenly distributed. This water is collected at the bottom of the tower in ditches 27, and is drawn from these ditches by pipes $27^x$, leading to pump 19, which again lifts the water to the top of the cooling tower. The water is thus used over and over again, thus giving a gain in efficiency, owing to the low temperature of the water collected at the bottom of the chamber. A pipe connection 28 to the pumps is used for starting. As the water trickling down the grate-work removes a majority of the moisture in the air, the water is augmented in amount, and to keep the water level in the upper tank constant, it is provided with pipe connections to take away the overflow, this being preferably directed to the sprays 6, in the inlet ducts. This overflow water being very cold, increases the effective working of these preliminary sprays.

Referring to the second cooling tower $2^a$, this is generally similar to the first, and similar parts are designated by similar numerals with the letter "a" applied. In the second tower, the brine or other non-congealable liquid will serve to cool the air to below zero degrees C., the brine being returned for use and cooled in the same manner as the water of the first tower.

The advantages of my invention result from doing away with refrigerating systems where the air passes over cooling pipes and reducing the air to the desired temperature, by direct contact with cooling liquids. By providing the preliminary cooling chambers, the work of the second tower may be made substantially uniform and continuous throughout the year. When desired, the first cooling tower may be cut out as in the winter months, and air led direct to the second tower, or cooling chambers may be used in part, as desired.

Many changes may be made in the form and arrangement of the apparatus, without departing from my invention.

I claim:

1. The method of drying air for metallurgical purposes, which consists in passing it upwardly through a chamber and subjecting it therein to the direct action of a descending shower or spray of artificially cooled congealable liquid, refrigerating said liquid out of contact with the air being treated, thereafter passing the air upwardly through another chamber or compartment, subjecting it therein to the direct action of an artificially cooled non-congealable liquid and reducing its temperature to or below zero degrees, and then feeding the dried air to a metallurgical apparatus, substantially as described.

2. The method of drying air for metallurgical purposes, which consists in passing it upwardly through a chamber and subjecting it therein to the direct action of a descending shower or spray of artificially cooled congealable liquid, refrigerating said liquid out of contact with the air being treated, thereafter passing the air upwardly through another chamber or compartment, subjecting it therein to the direct action of an artificially cooled non-congealable liquid and reducing its temperature to or below zero degrees C., and then passing the air to a blowing engine and thence to a metallurgical apparatus, substantially as described.

3. The method of drying air, consisting in passing it upwardly through a chamber, subjecting it therein to the direct action of a descending shower or spray of artificially cooled congealable liquid, and thereafter passing the air upwardly through another chamber and subjecting it therein to the direct action of an artificially cooled non-congealable liquid, and refrigerating both of said liquids while out of contact with the air being treated, substantially as described.

4. The method of drying air for metallurgical purposes, consisting in passing it upwardly through a chamber and subjecting it therein to the direct action of a descending shower or spray of an artificially cooled congealable liquid, refrigerating said liquid out of contact with the air being treated, thereafter passing said air upwardly through another chamber or compartment and subjecting it therein to the direct action of a descending shower or spray of an artificially cooled non-congealable liquid, thereby reducing the moisture to below two and one-half grains per cubic foot, and then passing the air to a blowing engine and thence to a metallurgical apparatus, substantially as described.

5. The method of drying air for metallurgical purposes, which consists in bringing the air into direct contact with successively cooler liquids in a series of steps, refrigerating one of said liquids while out of contact with the air being treated, and passing the cooled air to a blowing engine and thence to a metallurgical apparatus, substantially as described.

6. The method of drying air for metallurgical purposes, which consists in passing it upwardly through a chamber and subjecting it therein to the direct action of a downwardly descending shower or spray of an artificially cooled non-congealable liquid and thereby reducing it to or below zero degrees C., refrigerating said liquid while out of contact with the air being treated, and passing the air to a blowing engine, and thence to a metallurgical apparatus, substantially as described.

7. The method of drying air for metallurgical purposes, which consists in first spraying the air and then passing it upwardly through a chamber and subjecting it therein to the direct action of a descending shower or spray of artificially cooled congealable liquid, refrigerating said liquid out of contact with the air being treated, thereafter passing the air upwardly through another chamber or compartment and subjecting it therein to the direct action of an artificially cooled non-congealable liquid, and then feeding the dried air to a metallurgical apparatus, substantially as described.

8. The method of drying air, consisting in passing it through successive chambers, subjecting it in said chambers to the direct action of successively cooler artificially cooled liquids, refrigerating said liquids while out of contact with the air being treated, and feeding the dried air to a metallurgical apparatus, substantially as described.

In testimony whereof, I have hereunto set my hand.

JAMES GAYLEY.

Witnesses:
W. S. REED,
EUGENE H. MURPHY.